(12) United States Patent
Pursifull et al.

(10) Patent No.: US 9,523,326 B2
(45) Date of Patent: Dec. 20, 2016

(54) METHOD FOR DIRECT INJECTION OF SUPERCRITICAL FUELS

(71) Applicant: Ford Global Technologies, LLC, Dearborn, MI (US)

(72) Inventors: Ross Dykstra Pursifull, Dearborn, MI (US); Ulrich Kramer, Bergisch Gladbach (DE)

(73) Assignee: Ford Global Technologies, LLC, Dearborn, MI (US)

(*) Notice: Subject to any disclaimer, the term of this patent is extended or adjusted under 35 U.S.C. 154(b) by 204 days.

(21) Appl. No.: 14/579,091

(22) Filed: Dec. 22, 2014

(65) Prior Publication Data

US 2016/0177860 A1 Jun. 23, 2016

(51) Int. Cl.
| | |
|---|---|
| *F02D 41/38* | (2006.01) |
| *F02D 41/30* | (2006.01) |
| *F02D 41/00* | (2006.01) |
| *F02B 43/12* | (2006.01) |

(52) U.S. Cl.
CPC .......... *F02D 41/3836* (2013.01); *F02B 43/12* (2013.01); *F02D 41/0025* (2013.01); *F02D 41/0027* (2013.01); *F02D 41/3082* (2013.01); *F02D 2041/389* (2013.01); *F02D 2200/0602* (2013.01); *F02D 2200/0611* (2013.01)

(58) Field of Classification Search
CPC .............. F02D 41/3836; F02D 41/3082; F02D 41/0027; F02D 41/0025; F02D 41/0235; F02D 2041/389; F02B 43/12
See application file for complete search history.

(56) References Cited

U.S. PATENT DOCUMENTS

| | | | |
|---|---|---|---|
| 5,479,906 A | 1/1996 | Collie | |
| 6,213,104 B1* | 4/2001 | Ishikiriyama | ........... F02B 51/00 123/27 GE |
| 7,004,147 B2 | 2/2006 | Kang | |
| 7,765,991 B2 | 8/2010 | Thomas et al. | |
| 8,091,531 B2 | 1/2012 | Lucido et al. | |
| 8,443,785 B2 | 5/2013 | Carter | |
| 8,511,287 B2 | 8/2013 | Hofbauer et al. | |
| 2005/0252200 A1* | 11/2005 | Oono | .................. F02D 41/3845 60/285 |
| 2007/0144490 A1 | 6/2007 | Serra et al. | |
| 2009/0090331 A1 | 4/2009 | Pursifull | |

(Continued)

OTHER PUBLICATIONS

Pursifull, Ross D., "System and Method for Operating an Engine Combusting Liquefied Petroleum Gas," U.S. Appl. No. 13/970,519, filed Aug. 19, 2013, 30 pages.

(Continued)

*Primary Examiner* — Hung Q Nguyen
*Assistant Examiner* — Xiao Mo
(74) *Attorney, Agent, or Firm* — Julia Voutyras; Alleman Hall McCoy Russell & Tuttle LLP

(57) ABSTRACT

Methods are provided for improving delivery of supercritical fuels via a direct injector. An injector control parameter is adjusted based on one of a fuel pump gain, an injected fuel mass, or a change in pressure in the fuel rail, and the engine operates the injector based on the adjusted parameter. Injector control parameters are only adjusted when fluid is subcritical at the fuel pump and when injector overlap is not present.

19 Claims, 7 Drawing Sheets

(56) References Cited

U.S. PATENT DOCUMENTS

2010/0294236 A1* 11/2010 Surnilla ............. F02D 41/0025
                                                              123/304
2013/0150236 A1*  6/2013 Aoki ........................ B01J 23/63
                                                              502/303
2014/0123947 A1   5/2014 Song et al.

OTHER PUBLICATIONS

Pursifull, Ross D. et al., "High Pressure Fuel Pump Control for Idle Tick Reduction," U.S. Appl. No. 14/042,971, filed Oct. 1, 2013, 34 pages.
Ulrey, Joseph N. et al., "Currect Pulsing Control Methods for Lift Fuel Pumps," U.S. Appl. No. 14/444,739, filed Jul. 28, 2014, 48 pages.
Ulrey, Joseph N. et al., "Optimizing Intermittent Fuel Pump Control," U.S. Appl. No. 14/558,363, filed Dec. 2, 2014, 44 pages.
Pursifull, Ross D., "Direct Injection Pump Control," U.S. Appl. No. 14/560,497, filed Dec. 4, 2014, 49 pages.
Pursifull, Ross D., "Method and System for Supplying Liquefied Petroleum Gas to a Direct Fuel Injected Engine," U.S. Appl. No. 14/532,756, filed Nov. 4, 2014, 39 pages.

* cited by examiner

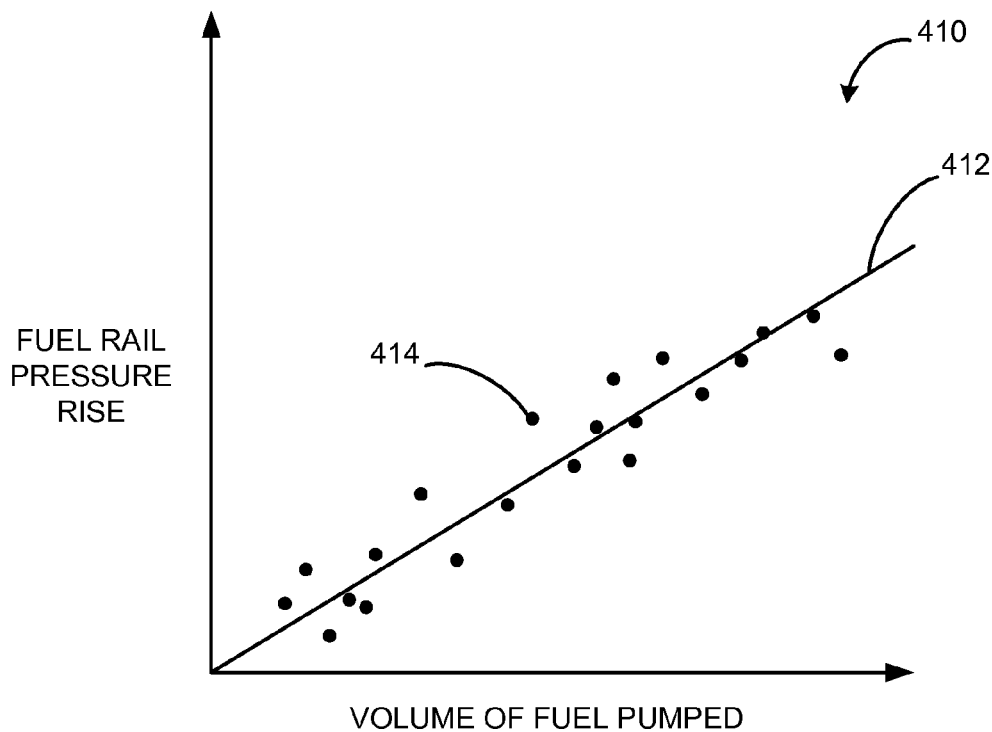
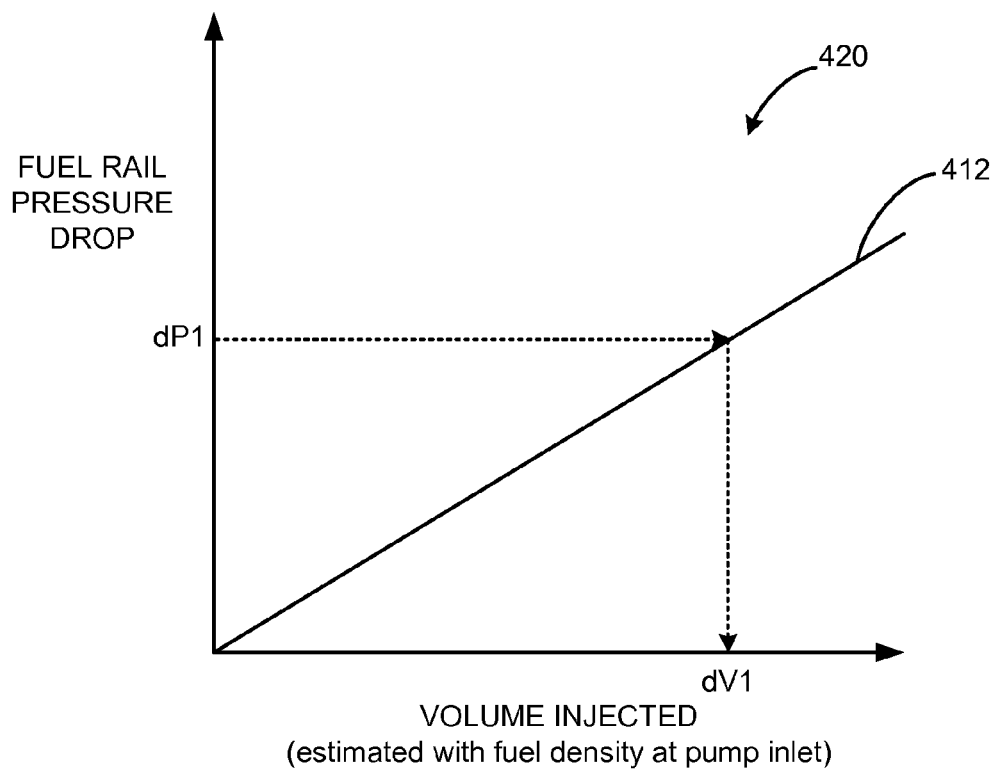
FIG. 4

METHOD FOR DIRECT INJECTION OF SUPERCRITICAL FUELS

FIELD

The present description relates generally to methods and systems for controlling a vehicle engine to directly inject fuels such as liquid petroleum gas directly into the combustion chamber based on conditions.

BACKGROUND/SUMMARY

In an internal combustion engine, the air-fuel ratio of combusted gasses may be controlled to address emissions. One source of air-fuel ratio errors may be an actual fuel injector flow rate being different than an expected fuel injector flow rate. One way to adjust a fuel injector flow rate is described by Thomas et al in U.S. Pat. No. 7,765,991. Therein, an output of an exhaust gas sensor is used in a feedback path to evaluate the error between an actual air-fuel ratio and a desired air-fuel ratio, and a fuel injector pulsewidth is adjusted based on this error, thereby adjusting the fuel injector flow rate.

However, the inventors herein have recognized potential issues for such systems. As one example, when using direct injection with fuels which are supercritical during at least some engine operating conditions, adjusting the fuel injection rate based on exhaust gas measurements may be unreliable. This is because in the supercritical state, the fuel's density within a sample can vary significantly and in a complex manner, which can result in unreliable exhaust gas measurements and thus inaccurate air-fuel ratio estimates. Supercritical fuels may effectively clean soot deposits from engine components, and direction injection of supercritical fuels may maintain engine cleanliness despite unpredictable injection properties.

In one approach, the issues above may be addressed by a method for a fuel system, comprising: adjusting a fuel injector control parameter based on an exhaust air-fuel ratio, selectively adjusting the fuel injector control parameter further based on a fuel pump gain, and operating a fuel injector based on the fuel injector control parameter. In this way, a desired amount of fuel injected may be accurately controlled over a wide range of engine temperatures and pump pressures, thereby ensuring desired air-fuel ratios. Furthermore, by allowing the fuel to be in a supercritical state at the fuel injector, advantages of supercritical fuels such as cleanliness of injector components and low soot emissions may be achieved while also achieving the desired air-fuel ratio.

As one example, a relationship between a volume of fuel delivered to the fuel rail by the direct injection fuel pump and a resultant increase in fuel rail pressure may be determined. This relationship may herein be referred to as a fuel pump gain, and may be based on an average of fuel pump gain estimates over a plurality of commanded pump strokes. In this way, an amount of pressure in the fuel rail may be associated with a fuel mass. A change in pressure upon an injection event may be measured and associated with an injected fuel mass based on the fuel pump gain. In response, an injector control parameter such as an injection gain may be increased, thereby increasing the commanded injection volume. By adjusting an injector gain based on the fuel pump gain pumping subcritical fuel, a desired injection mass may be delivered even when fuel density at the injection site is not predictable. For example, determinations of supercritical or subcritical fuel at the pump can be used to adjust operation and maintain improved air-fuel ratio control in the engine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4 shows plots of a direct injection fuel pump gain and a relationship between a change in fuel rail pressure upon injection and nominal injection volume;

DETAILED DESCRIPTION

Figure 1:
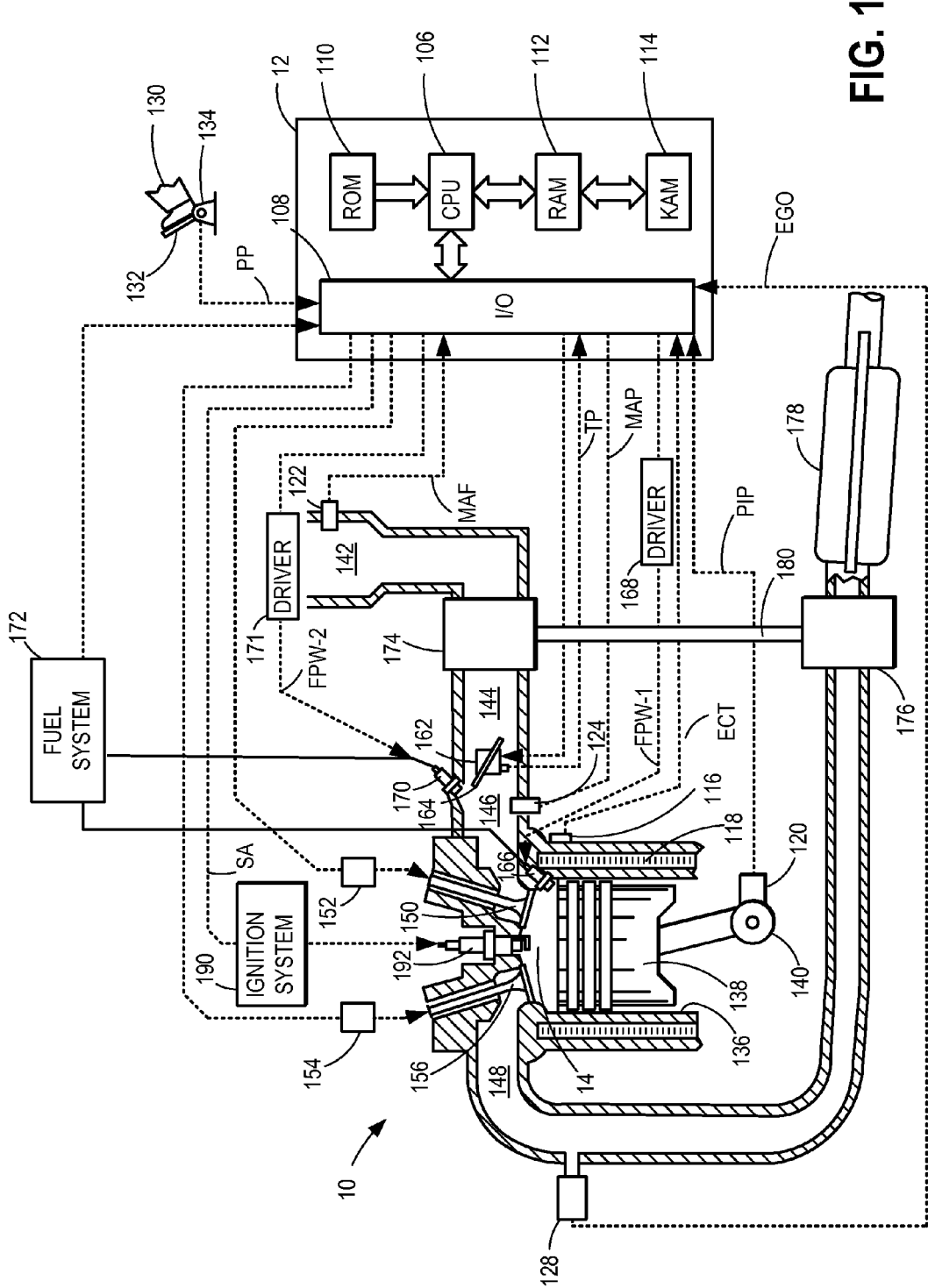
FIG. 1 shows an engine system including a direct fuel injector and a port fuel injector, and configured to operate with fuels that are supercritical during at least some engine operating conditions.
Figure 2:
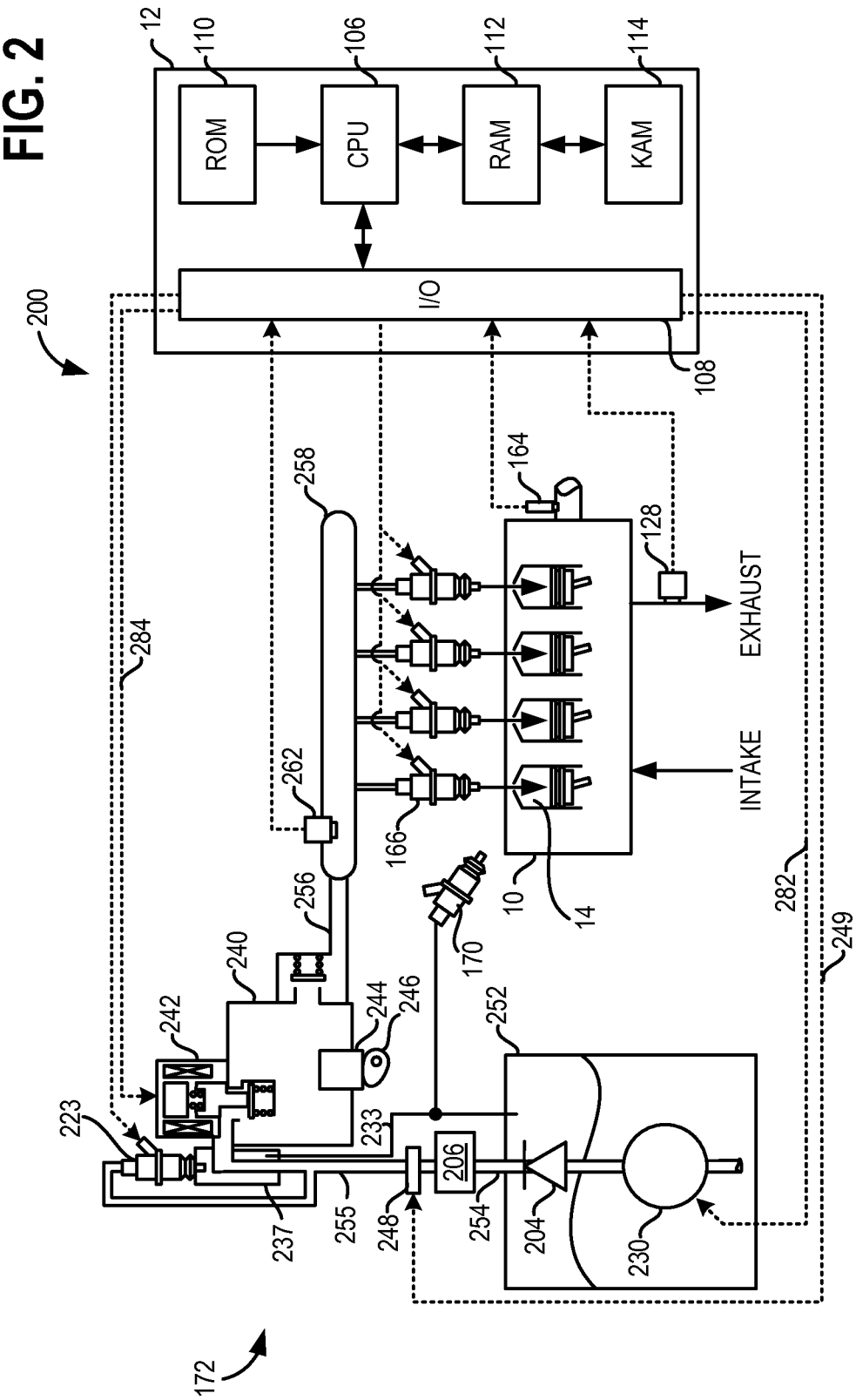
FIG. 2 shows a schematic diagram of an example fuel system coupled to an engine.
Figure 3:
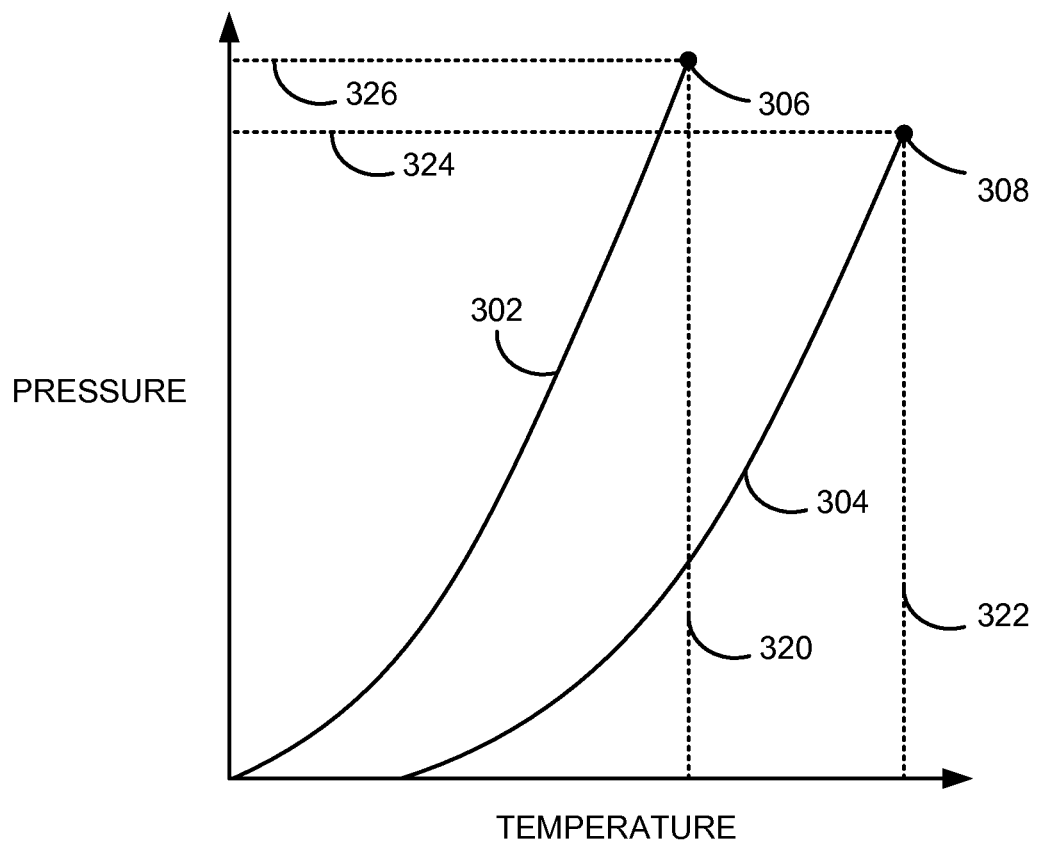
FIG. 3 shows a plot of temperature and pressure where a fuel becomes supercritical.
Figure 5:
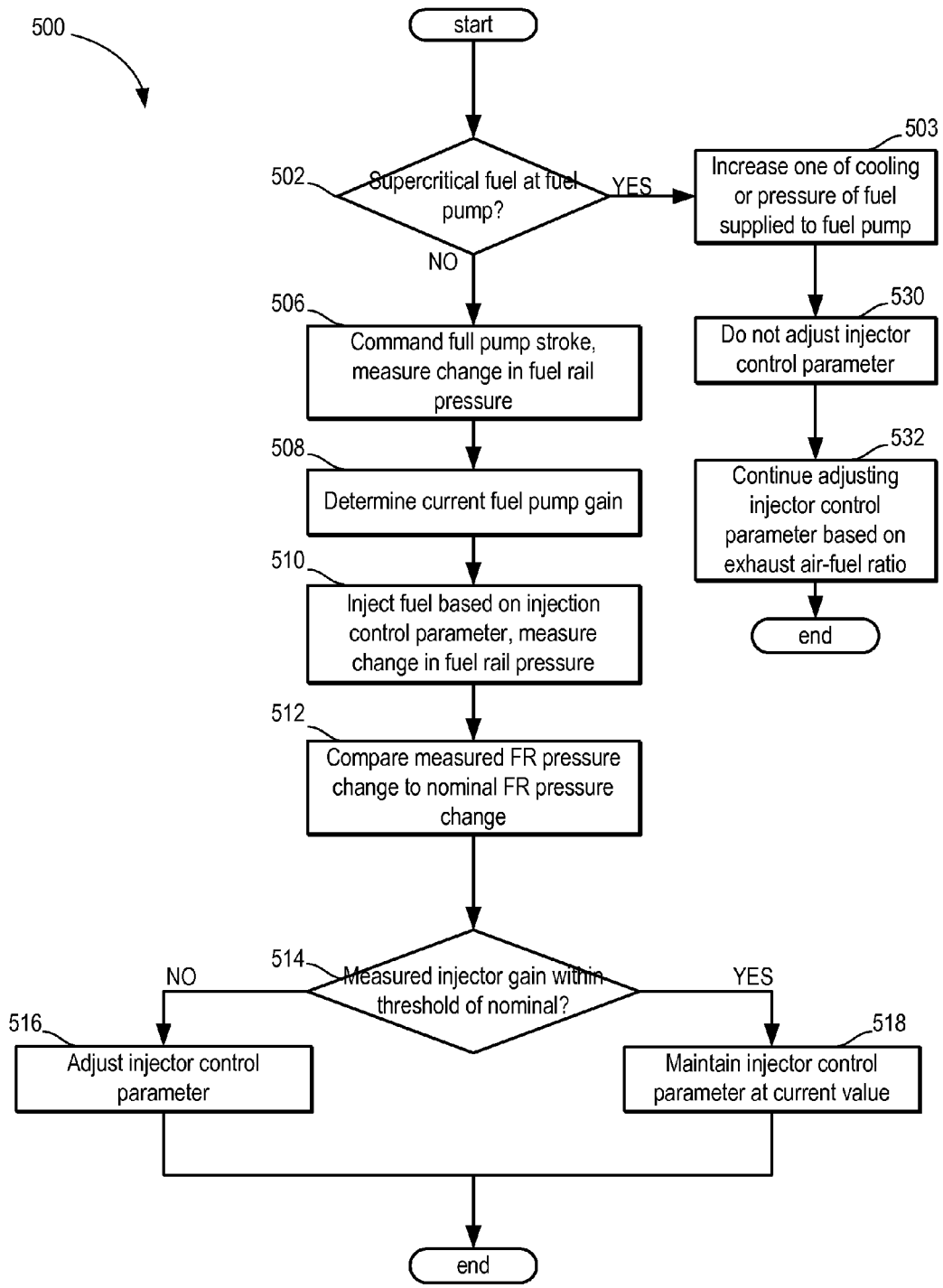
FIG. 5 shows an example prophetic sequence for adjusting an injector control parameter based on a fuel pump gain.
Figure 6:
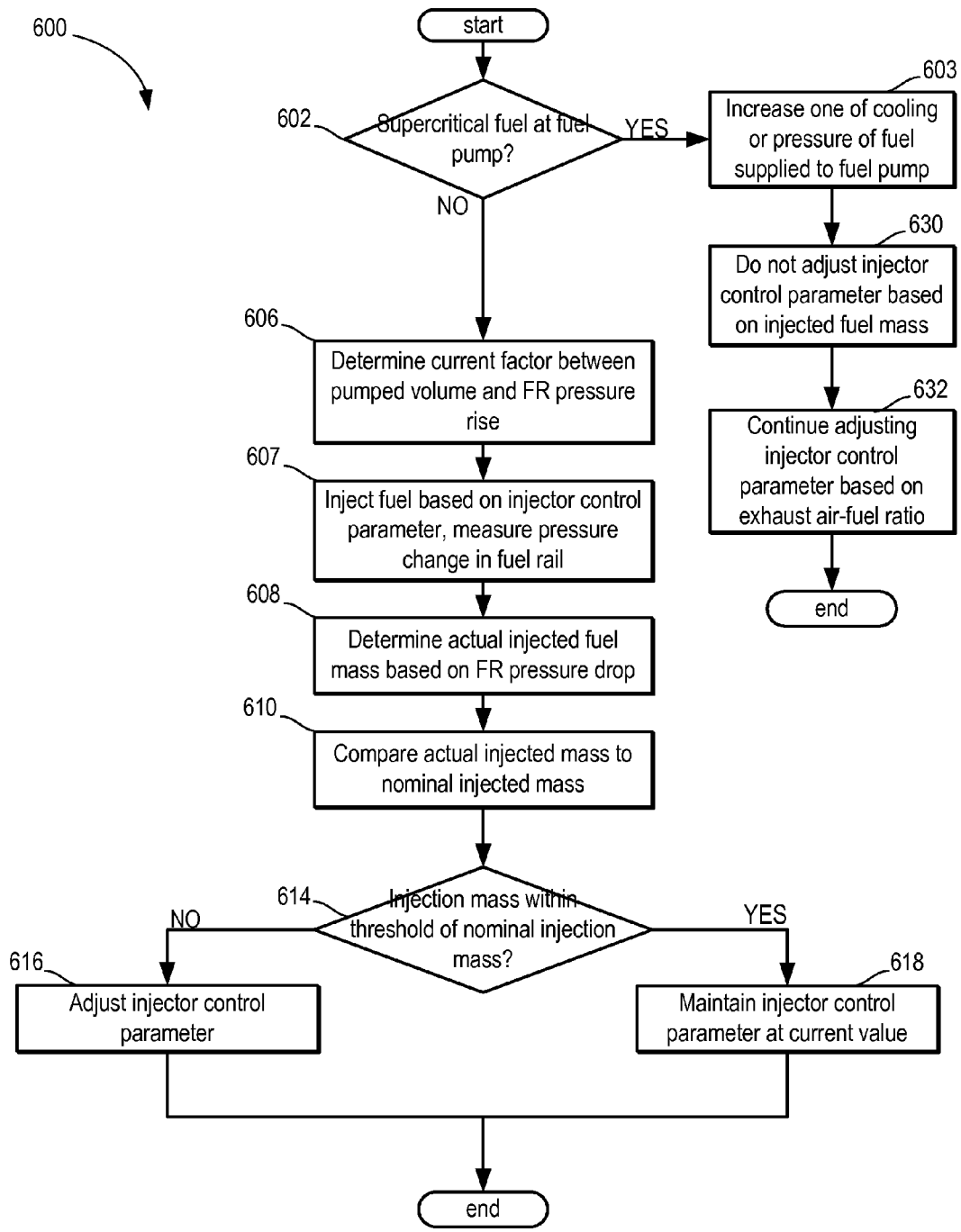
FIG. 6 shows an example method for adjusting an injector control parameter based on a fuel rail pressure change.
Figure 7:
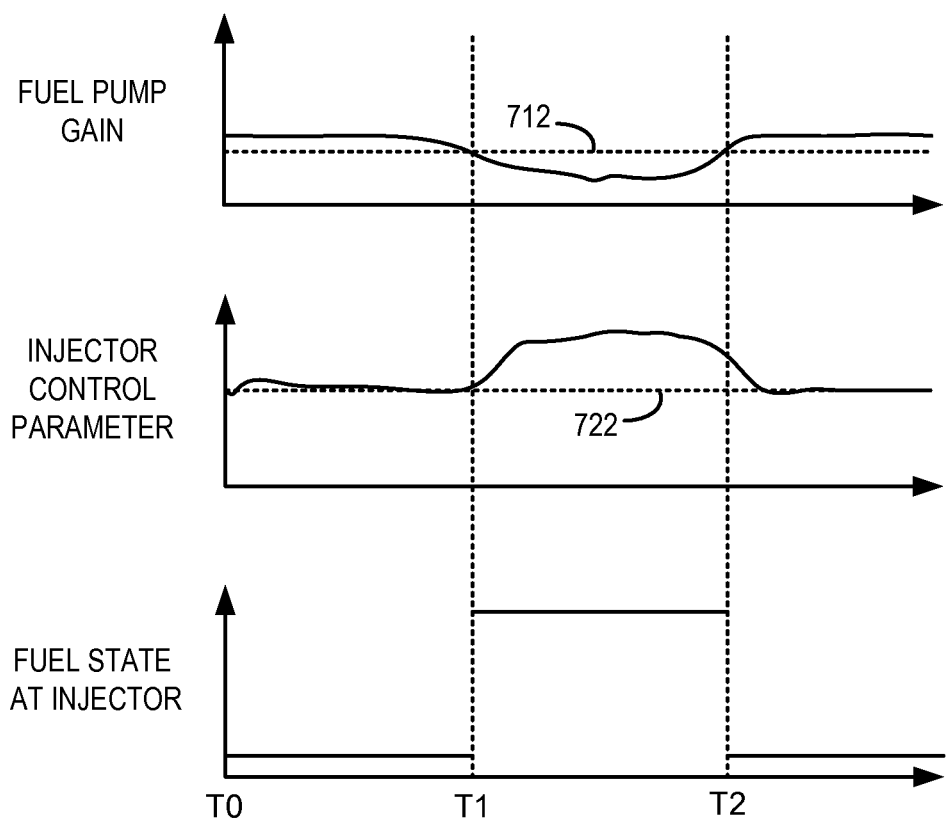
FIG. 7 shows an example method for adjusting an injector control parameter based on a fuel pump gain.

The present description is related to adjusting control parameters of a direct fuel injector configured to deliver liquefied petroleum gas (LPG) or similar fuels to an internal combustion engine. The engine may be an engine with direct fuel injection where fuel is injected directly into engine cylinders as is shown in FIGS. 1-2. The fuel injected may have properties as are shown in FIG. 3. The fuel pump configured to deliver high pressure fuel to the direct fuel injector may operate according to a transfer function and a transfer function gain relating a spill valve opening duration to a mass of fuel injected as shown in FIG. 4. Under some conditions a fuel injector control parameter may be adjusted based on the fuel pump gain as is shown in FIG. 5. Finally, FIGS. 6-7 show methods by which fuel injector control parameters may be adjusted to deliver a desired amount of fuel.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or may alternatively be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from high pressure fuel system 172 including a fuel tank, fuel pumps, a fuel rail, and driver 168. Further, while not shown, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW-2 received from controller 12 via electronic driver 171. Fuel may be delivered to fuel injector 170 by fuel system 172.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions such as described herein below. The relative distribution of the total injected fuel among injectors 166 and 170 may be referred to as a first injection ratio. For example, injecting a larger amount of the fuel for a combustion event via (port) injector 170 may be an example of a higher first ratio of port to direct injection, while injecting a larger amount of the fuel for a combustion event via (direct) injector 166 may be a lower first ratio of port to direct injection. Note that these are merely examples of different injection ratios, and various other injection ratios may be used. Additionally, it should be appreciated that port injected fuel may be delivered during an open intake valve event, closed intake valve event (e.g., substantially before an intake stroke, such as during an exhaust stroke), as well as during both open and closed intake valve operation. Similarly, directly injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the compression stroke, multiple injections during the intake stroke, or a combination of some direct injections during the compression stroke and some during the intake stroke. When multiple direct injections are performed, the relative distribution of the total directed injected fuel between an intake stroke (direct) injection and a compression stroke (direct) injection may be referred to as a second injection ratio. For example, injecting a larger amount of the direct injected fuel for a combustion event during an intake stroke may be an example of a higher second ratio of intake stroke direct injection, while injecting a larger amount of the fuel for a combustion event during a compression stroke may be an example of a lower second ratio of intake stroke direct injection. Note that these are merely examples of different injection ratios, and various other injection ratios may be used.

As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel system 172 may include one fuel tank or multiple fuel tanks. In embodiments where fuel system 172 includes multiple fuel tanks, the fuel tanks may hold fuel with the same fuel qualities or may hold fuel with different fuel qualities, such as different fuel compositions. These differences may include different alcohol content, different octane, different heat of vaporizations, different fuel blends, and/or combinations thereof etc. In some examples, fuel system 172 may include a fuel tank holding a liquid fuel, such as liquid petroleum gas (LPG), and also include a fuel tank holding a gaseous fuel, such as compressed natural gas (CNG). In other examples, fuel system 172 may include a fuel tank holding a first liquid fuel, such as LPG, and a fuel tank holding a second liquid fuel, such as gasoline. Fuel injectors 166 and 170 may be configured to inject fuel from the same fuel tank, from different fuel tanks, from a plurality of the same fuel tanks, or from an overlapping set of fuel tanks. In one example, fuel injector 166 may be configured to inject LPG from a first fuel tank, and fuel injector 170 may be configured to inject gasoline from a second fuel tank. In a further example, fuel injector 166 may be configured to inject LPG from a first fuel tank, and fuel injector 170 may be configured to inject gasoline from a second fuel tank. In a still further example, each of fuel injectors 166 and 170 may be configured to inject LPG from a common fuel tank. In other examples, one or more of fuel injector 166 and fuel injector 170 may be configured to inject CNG.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. An example routine that may be performed by the controller is described at FIGS. 6 and 7.

Referring now to FIG. 2, it shows a direct injection fuel system 200 coupled to an internal combustion engine 10, which may be configured as a propulsion system for a vehicle. The internal combustion engine 10 may comprise multiple combustion chambers or cylinders 14. LPG fuel can be provided directly to the cylinders 14 via in-cylinder direct injectors 166. As indicated schematically in FIG. 2, the engine 10 can receive intake air and it can exhaust products of the combusted fuel and air.

Fuel can be provided to the engine 10 via the injectors 166 by way of a fuel system indicated generally at 172. In this particular example, the fuel system 172 includes a fuel storage tank 252 for storing the fuel on-board the vehicle, a lower pressure fuel pump 230 (e.g., a fuel lift pump), a higher pressure fuel pump or direct injection fuel pump 240, a fuel rail 258, and various fuel passages 254, 255, and 256. In the example shown in FIG. 2, the fuel passage 254 carries fuel from the lower pressure pump 230 to the fuel filter 206. Fuel passage 255 carries fuel from fuel filter 206 to fuel cooling chamber 237 before fuel reaches direct injection fuel pump 240. Fuel passage 256 carries fuel from the fuel injection pump 240 to the fuel rail 258.

Fuel cooling chamber 237 includes a fuel injector 223 that is supplied fuel from fuel passage 255. Fuel injector may inject fuel into fuel cooling chamber 237 where the pressurized fuel expands to vapor and cools liquid fuel flowing into direct injection fuel pump 240. Expanded fuel may be injected to engine 10 via a port fuel injector 170 which injects vaporized fuel into the engine intake manifold or cylinder intake runners. Alternatively, expanded fuel may exit fuel cooling chamber 237 and be returned to fuel tank 252 via passage 233. Fuel injector 223 is opened and closed via a pulse width modulated voltage supplied by controller 12. This gaseous fuel may also be routed to the fuel vapor purge system which is in place for the gasoline fuel system, if the vehicle is equipped with an auxiliary gasoline system. In this way, by injecting expanded fuel into fuel cooling chamber 237, fuel that enters the direct injection pump inlet may be maintained below an upper threshold temperature.

Fuel rail 258 may distribute fuel to each of a plurality of fuel injectors 166. Each of the plurality of fuel injectors 166 may be positioned in a corresponding cylinder 14 of engine 10 such that during operation of fuel injectors 166 fuel is injected directly into each corresponding cylinder 14. Alternatively (or in addition), engine 10 may include fuel injectors positioned at the intake port of each cylinder such that during operation of the fuel injectors fuel is injected in to the intake port of each cylinder. In the illustrated example, engine 10 includes four cylinders. However, it will be appreciated that the engine may include a different number of cylinders.

The lower pressure fuel pump 230 can be operated by a controller 12 to provide fuel to fuel injection pump 240 via fuel passage 254. The lower pressure fuel pump 230 can be configured as what may be referred to as a fuel lift pump. As one example, lower pressure fuel pump 230 can include an electric pump motor, whereby the pressure increase across the pump and/or the volumetric flow rate through the pump may be controlled by varying the electrical power provided to the pump motor, thereby increasing or decreasing the motor speed. For example, as the controller 12 reduces the electrical power that is provided to pump 230, the volumetric flow rate and/or pressure increase across the pump 230 may be reduced. The volumetric flow rate and/or pressure increase across the pump may be increased by increasing the electrical power that is provided to the pump 230. As one example, the electrical power supplied to the lower pressure pump motor can be obtained from an alternator or other energy storage device on-board the vehicle (not shown), whereby the control system can control the electrical load that is used to power the lower pressure pump 230. Thus, by varying the voltage and/or current provided to the lower pressure fuel pump 230 via conductor 282, the flow rate and pressure of the fuel provided to fuel injection pump 240 and ultimately to the fuel rail may be adjusted by the controller 12.

Low-pressure fuel pump 230 may be in fluid communication with check valve 204 to facilitate fuel delivery, prevent fuel backflow, and maintain fuel line pressure. In particular, check valve 204 includes a ball and spring mechanism that seats and seals at a specified pressure differential to deliver fuel downstream of check valve 204. In some examples, fuel system 250 may include a series of check valves in fluid communication with low-pressure fuel pump 230 to further impede fuel from leaking back upstream of the valves. Check valve 204 is in fluid communication with fuel filter 206. Fuel filter 206 may remove small impurities that may be contained in the fuel that could potentially restrict fuel flow. Fuel may be delivered from filter 206 to fuel injector 223 and high-pressure fuel pump (e.g., fuel injection pump) 240. Fuel injection pump 240 may increase the pressure of fuel received from the fuel filter from a first pressure level generated by low-pressure fuel pump 230 to a second pressure level higher than the first level. Fuel injection pump 240 may deliver high pressure fuel to fuel rail 258 via fuel line 256. Fuel injection pump 240 may be a positive displacement pump. Operation of direct injection fuel pump 240 may be adjusted based on operating conditions of the vehicle in order to ensure the fuel being delivered is in a liquid state at fuel injection pump 240.

The direct injection fuel pump 240 can be controlled by the controller 12 to provide fuel to the fuel rail 258 via the fuel passage 256. As one non-limiting example, fuel injection pump 240 may utilize a flow control valve, a solenoid actuated "spill valve" (SV) or fuel volume regulator (FVR), indicated at 242 to enable the control system to vary the effective pump volume of each pump stroke. In one example, the control system may be configured to vary the duration for which spill valve 242 is open during a pump stroke of fuel injection pump 240, thus varying the mass of fuel delivered to fuel rail 258 for each pump stroke. The fuel injection pump 240 may be mechanically driven by the engine 10 in contrast to the motor driven lower pressure fuel pump or fuel lift pump 230. A pump piston 244 of the direct injection fuel pump 240 can receive a mechanical input from the engine crank shaft or cam shaft via a cam 246. In this manner, fuel injection pump 240 can be operated according to the principle of a cam-driven single-cylinder pump.

As depicted in FIG. 2, a fuel sensor 248 is disposed in passage 254 downstream of the fuel lift pump 230. The fuel sensor 248 may measure fuel composition and may operate based on fuel capacitance, or the number of moles of a dielectric fluid within its sensing volume. For example, an amount of ethanol (e.g., liquid ethanol) in the fuel may be determined (e.g., when a fuel alcohol blend is utilized) based on the capacitance of the fuel. The fuel sensor 248 may be used to determine a level of vaporization of the fuel, as fuel vapor has a smaller number of moles within the sensing volume than liquid fuel. As such, fuel vaporization may be indicated when the fuel capacitance drops off. As described in greater detail with reference to FIGS. 4 and 5, the fuel sensor 248 may be utilized to determine the level of fuel vaporization of the fuel such that the controller 12 may adjust the lift pump output pressure in order to reduce fuel vaporization within the fuel lift pump 230.

Further, in some examples, the direct injection fuel pump 240 may be operated as the fuel sensor 248 to determine the level of fuel vaporization. For example, a piston-cylinder assembly of the fuel injection pump 240 forms a fluid-filled capacitor. As such, the piston-cylinder assembly allows the fuel injection pump 240 to be the capacitive element in the fuel composition sensor. In some examples, the piston-cylinder assembly of the fuel injection 240 may be the warmest point in the system, such that fuel vapor forms there first. In such an example, the direct injection fuel pump 240 may be utilized as the sensor for detecting fuel vaporization, as fuel vaporization may occur at the piston-cylinder assembly before it occurs anywhere else in the system.

As shown in FIG. 2, the fuel rail 258 includes a fuel rail pressure sensor 262 for providing an indication of fuel rail pressure to the controller 12. An engine speed sensor 264 can be used to provide an indication of engine speed to the controller 12. The indication of engine speed can be used to identify the speed of fuel injection pump 240, since the pump 240 is mechanically driven by the engine 10, for example, via the crankshaft or camshaft. An exhaust gas sensor 128 can be used to provide an indication of exhaust gas composition to the controller 12. As one example, the gas sensor 128 may include a universal exhaust gas sensor (UEGO). The exhaust gas sensor 128 can be used as feedback by the controller to adjust the amount of fuel that is delivered to the engine via the injectors 166. In this way, the controller 12 can control the air-fuel ratio delivered to the engine to a desired air-fuel ratio.

Furthermore, controller 12 may receive other engine/exhaust parameter signals from other engine sensors such as engine coolant temperature, engine speed, throttle position, absolute manifold pressure, emission control device temperature, etc. Further still, controller 12 may provide feedback control based on signals received from fuel sensor 248, pressure sensor 262, and engine speed sensor 264, among others. For example, controller 12 may send signals to adjust a current level, current ramp rate, pulse width of a solenoid valve (SV) 242 of fuel injection pump 240, and the like to adjust operation of fuel injection pump 240, a fuel pressure set-point of fuel pressure regulator, and/or a fuel injection amount and/or timing based on signals from fuel sensor 248, pressure sensor 262, engine speed sensor 264, and the like.

The controller 12 can individually actuate each of the injectors 166 and injector 170. The controller 12 and other suitable engine system controllers can comprise a control system. The controller 12, in this particular example, includes an electronic control unit comprising one or more of an input/output device 108, a central processing unit (CPU) 106, read-only memory (ROM) 110 or non-transitory memory, random-accessible memory (RAM) 112, and keep-alive memory (KAM) 114. The storage medium ROM 110 can be programmed with computer readable data representing non-transitory instructions executable by the processor 106 for performing the methods described below as well as other variants that are anticipated but not specifically listed.

As shown, direct injection fuel system 200 is a returnless fuel system, and may be a mechanical returnless fuel system (MRFS) or an electronic returnless fuel system (ERFS). In the case of an MRFS, the fuel rail pressure may be controlled via a pressure regulator (not shown) positioned at the fuel tank 252. In an ERFS, a pressure sensor 262 may be mounted at the fuel rail 258 to measure the fuel rail pressure relative to the manifold pressure. The signal from the pressure sensor 262 may be fed back to the controller 12 which modulates the voltage to the fuel injection pump 240 for supplying the desired fuel pressure and fuel flow rate to the injectors.

Although not shown in FIG. 2, in other examples, direct injection fuel system 200 may include a return line whereby excess fuel from the engine is returned via a fuel pressure regulator to the fuel tank via a return line. A fuel pressure regulator may be coupled in line with a return line to regulate fuel delivered to fuel rail 258 at a desired pressure. To regulate the fuel pressure at the desired level, the fuel pressure regulator may return excess fuel to fuel tank 252 via the return line. It will be appreciated that operation of fuel pressure regulator may be adjusted to change the desired fuel pressure to accommodate operating conditions.

Thus, the system of FIG. 2 provides for a vehicle system, comprising: an engine; a direct injection fuel pump supplying fuel to the engine, the direct injection fuel pump including a fuel cooling chamber; a cooling injector in fluidic communication with the cooling chamber; a lift pump supplying fuel to the direct injection fuel pump; and a controller including instructions stored in non-transitory memory for increasing fuel flow to the fuel cooling chamber in response to a volumetric efficiency of the direct injection fuel pump. The vehicle system further comprises instructions for increasing output pressure of the lift pump in response to the volumetric efficiency of the direct injection fuel pump. The vehicle system includes where the volumetric efficiency of the direct injection fuel pump is a basis for determining liquid fuel is being supplied to the direct injection fuel pump. The vehicle system further comprises a port fuel injector in fluidic communication with the fuel cooling chamber. The vehicle system further comprises a fuel passage providing fluid communication between the fuel cooling chamber and a fuel tank. The vehicle system includes where the controller includes additional instructions for determining a direct injection fuel pump volumetric efficiency error.

The plot of FIG. 3 has a Y axis that represents pressure and pressure increases in the direction of the Y axis arrow. The plot of FIG. 3 also includes a X axis that represents temperature and temperature increases in the direction of the X axis arrow.

Curve 302 represents a phase line that separates where propane is liquid or gaseous. Propane is in a liquid state when it is at conditions above curve 302, and it is in a gaseous state when it is at conditions below curve 302. Propane reaches a supercritical state at temperatures and pressures above 306. Horizontal line 326 represents a temperature where propane becomes supercritical. Vertical line 320 represents a temperature where propane becomes supercritical.

Curve 304 represents a phase line that separates where butane is liquid or gaseous. Butane is in a liquid state when it is at conditions above curve 304, and it is in a gaseous state when it is at conditions below curve 304. Butane reaches a supercritical state at temperature and pressures above 308. Horizontal line 324 represents a temperature where butane becomes supercritical. Vertical line 322 represents a temperature where butane becomes supercritical. At temperatures greater than 322, butane is supercritical. At pressures greater than 324, butane is supercritical.

Liquid petroleum gas as sold for automobiles, sometimes sold under the name Autogas, is most often a mixture of propane and butane. Thus, when operating a vehicle configured with LPG as a fuel source, it may be desirable to hold propane to temperatures less than 320 and pressures less than 326 so that mass of propane supplied to the engine may be accurately determined and regulated. Similarly, it may be desirable to hold butane to temperatures less than 322 and pressures less than 324 so that mass of butane supplied to the engine may be accurately determined and regulated. However, during at least some engine operating conditions, temperatures at the direct injector may surpass temperatures 320 or 322, and a fuel containing propane or butane may respectively become supercritical. In this case, the density of such a fuel becomes less predictable, and accordingly the relationship between an injection mass and an injection pulsewidth becomes less reliable.

FIG. 4 provides two plots 410 and 420 which respectively depict a fuel pump gain and a relationship between a measured decrease in fuel pressure for an injection event and a nominal injected volume. Each plot utilizes a curve 412 which is based on volume and pressure measurements taken at the fuel pump inlet with subcritical fuel.

Turning first to plot 410, the Y axis represents a change in pressure in the fuel rail upon a pump stroke from the direct injection fuel pump, and change in pressure increases in the direction of the Y axis arrow. The X axis represents a volume of fuel pumped by the direct injection fuel pump and volume increases in the direction of the X axis arrow. Each data point 414 may represent a measurement of a change in fuel rail pressure resultant from the pumping of a known volume of fuel into the fuel rail. Thus each data point 414 provides a single estimate of a fuel pump gain. The data points 414 may only be recorded during conditions in which fuel at the fuel pump inlet is determined to be a liquid or subcritical. Determining a volume of fuel to pump during a particular pumpstroke may be based on a desired mass of fuel to pump and an estimated fuel density. If the fuel is maintained at subcritical conditions at the fuel pump inlet, the estimated fuel density may be a predictable quantity (e.g., based on a measured or estimated DI pump inlet temperature). Based on a number of data points 414, a curve 412 may be generated via a statistical method. In one example, linear regression may be performed on data points 414 to generate curve 412. In another example, recursive least squares may be performed on data points 414 to generate curve 412, as it is more suited to continuous processing than regressing a batch of data. Furthermore, curve 412 may be repeatedly updated based on the collection of more data points 414, thereby providing a real-time estimate of fuel pump gain based on an average of estimates of fuel pump gain. In this way, if fuel density in the fuel rail fluctuates in some unknown manner, the relationship between mass entering via the pump and fuel rail pressure rise may be reestablished in real time.

Because the pump is pumping subcritical fuel, its added mass per pump stroke may be accurately computed. This computation may establish the current relationship between pressure change versus fuel mass change in the fuel rail. This computed relationship, along with a measured change in pressure resultant from a fuel injection event, may be used to determine an injected fuel mass without information regarding the density or bulk modulus of the supercritical fuel in the fuel rail. In this way, an injected mass of supercritical fuel may be determined in real time based on each of a change in fuel rail pressure from pumping subcritical fuel and a change in fuel rail pressure from injecting supercritical fuel.

Turning now to plot 420, the Y axis represents a change in pressure in the fuel rail pump resultant from an injection event, and change in pressure decreases in the direction of the Y axis arrow. The X axis represents a volume of fuel associated with the change in pressure represented by the Y axis, the volume increasing in the direction of the X axis arrow and representing a volume of fuel pumped into the fuel rail. Curve 412, as generated from data points 414 at plot 410, may be adapted by plot 420 to convert a decrease in fuel rail pressure upon an injection event to an estimate of the volume of fuel pumped into the inlet. Because the relationship between fuel rail pressures and volumes of fuel that is described by curve 412 was determined based on measurements of subcritical fuel, it provides an accurate estimate of the volume of fuel in the fuel rail. Thus, whether or not the fuel is supercritical at the fuel injector, the change in pressure resultant from the fuel injection event may be converted to a pumped fuel volume. Further, because the fuel was pumped at subcritical conditions, a nominal subcritical density may be used to accurately relate the drop in fuel rail pressure to a mass of fuel injected.

For example, a drop in fuel rail pressure dP1 may be measured during an injection event. This injection event may have an associated nominal injection volume (not shown) that was determined based on a desired injection mass and a nominal fuel density. The desired injection mass may herein also be referred to as a nominal injection mass. The drop in fuel rail pressure dP1 may be associated with a pumped fuel volume dV1 via curve 412. The associated pumped fuel volume dV1 may be multiplied by a nominal fuel density to determine an actual injected fuel mass. In this way, a change in fuel rail pressure may be related to an injected fuel mass via a nominal fuel density and measurements of pressure and volume taken at a fuel pump.

In some examples, this injected mass may be compared to a nominal injected mass, and an injector control parameter may be adjusted based on this comparison. For example, an injector gain may be adjusted to adjust the relationship between a desired injection mass and a commanded injection volume. For instance, the nominal injected fuel mass may be greater than the actual injected fuel mass, indicating that the density of fuel within the fuel rail is lower than predicted. Accordingly an injector gain may be increased to increase the nominal injection volume associated with a desired injection mass. In one embodiment, the injector gain may be a factor which multiplies a nominal injection volume as determined based on a subcritical fluid density to determine a commanded injection volume. In an alternate embodiment, the injector gain may be a factor which adjusts the relationship between an injector pulsewidth and a desired injection mass.

In this way, the injector gain may be at or near 1 when the fuel is subcritical, and the injector gain may be adjusted in response to a change in fuel density at the injection site, the change in density detected based on a comparison of nominal injection mass to actual injected fuel mass. For example, during a first condition, injector gain may be increased, thereby increasing a commanded injection volume, and during a second condition, injector gain may be decreased, thereby decreasing a commanded injection volume. In one example, the first condition may include when an actual injection mass is less than a desired injection mass, and the second condition may include when an actual injection mass is greater than a desired injection mass. In this example, the adjusting of fuel injector gain is in the signed direction of the difference of a desired injection mass and an actual injection mass. In a second example, the first condition may include when the fuel density at the fuel rail becomes less than the subcritical fuel density estimate, and the second condition may include when the fuel density at the fuel rail becomes greater than the subcritical fuel density estimate. In this example, the adjusting of fuel injector gain is in the signed direction of the difference of a subcritical fuel density and a current fuel rail density in the fuel rail.

FIGS. 5 and 6 provide flowcharts for routines 500 and 600, which depict routines for adjusting fuel injector control parameters based on a change in fuel rail pressure and an injected fuel mass, respectively. In one example, the fuel injector control parameter may be a fuel injector gain. In another example, the fuel injector control parameter may be a transfer function gain of a fuel injector. It will be appreciated that these examples are non-limiting, and that the injector control parameter that is adjusted may be a parameter other than injector gain or transfer function gain.

Referring now to FIG. 5, it provides routine 500 for adjusting a fuel injector control parameter based on a change in fuel rail pressure and further based on determinations of whether the fuel is each of subcritical and supercritical at the fuel pump.

Routine 500 may include adjusting the injector control parameter based on the difference of a measured change in fuel rail pressure and a predicted or nominal change in fuel rail pressure. In this example, the measured change in pressure is resultant from an injection event of a commanded volume. The commanded injection volume may be based on one or more of a desired injection mass, a nominal fuel density, and an injector control parameter. The fuel injector may be delivering a fuel which is supercritical during at least some engine operating conditions, such as LPG.

At 502 the engine controller determines whether the fuel is subcritical or supercritical at the fuel pump. In one example, determining whether the fuel is subcritical or supercritical at the fuel pump may be based on a comparison of a temperature measurement at the fuel pump to a phase diagram for the fuel (e.g., the diagram of FIG. 3) stored on the engine controller's memory. In another example, 502 may include determining whether a direct injection fuel pump gain is below a lower threshold, the lower threshold determined based on one of a measured or inferred fuel rail temperature. If the fuel is determined to be supercritical at the fuel pump or if the fuel pump gain is below the lower threshold, routine 500 proceeds to 503.

In some examples, 502 may further include determining whether injector overlap is currently present. Determining whether injector cycles are currently overlapping may be based on comparing injection pulse signals for each injector on a fuel rail. In such examples, if there is one or more overlap of injector cycles, routine 500 proceeds to 530, then to 532, as described in further detail below. However, if injector overlap is not present, routine 500 proceeds to 506. In this way, changes in fuel rail pressure may be the result of only one fuel injector and one injection event, and the control parameter for only that fuel injector may be adjusted based on the change in fuel rail pressure.

Continuing at 503, one of cooling or pressure of the fuel supplied to the fuel pump is increased in order to change the state of the fuel from supercritical to subcritical or to increase the fuel pump gain. Routine 500 continues from 503 to 530, where the injector control parameter is not adjusted based on a change in fuel rail pressure, and then to 532, where the injector parameter may be adjusted based on an estimated exhaust air-fuel ratio. Further, the fuel injector control parameter may be adjusted based on an exhaust air-fuel ratio, and selectively adjusted further based on a change in fuel rail pressure if fuel is subcritical at the fuel pump inlet. In this way, the fuel injector control parameter may be adjusted when fuel is liquid at the fuel pump, providing a reliable metering device with which to calibrate the fuel injector.

Returning to 502, if the fuel is subcritical at the fuel pump inlet, adaptation of the fuel injector control parameter may occur, and routine 500 proceeds to 506. A full pump stroke of the fuel injection pump is commanded at 506. The full pump stroke may have an associated pump stroke volume based on the length of the stroke and physical parameters of the fuel injection pump piston. Additionally, the change in pressure within the fuel pump that results from the full pump stroke is measured at 506, for instance via a pressure sensor within the fuel rail. the adjusting is based on a difference of a measured change in fuel rail pressure to a predicted change in fuel rail pressure.

At 508 a fuel pump gain is determined based on the commanded pump stroke volume and resultant pressure rise measured at 506. The fuel pump gain may be the gain described with reference to FIG. 4. As described therein, a fuel pump gain may be determined based on a number of pumping events, with a linear regression performed based on the number of measurements from the events to determine a slope of pressure increase versus volume of fuel pumped.

Proceeding to 510, fuel is injected via one direct fuel injector, and the resulting change in pressure in the fuel rail is measured via a pressure sensor. In some examples, 510 may include injecting fuel via one direct fuel injector while also injecting fuel via one or more port fuel injector. However the injections referred to herein are via direct injectors unless stated otherwise. Injecting the fuel includes injecting a commanded volume of fuel. The commanded injection volume of fuel may be based on a fuel injection control parameter applied to a nominal injection volume. The nominal fuel volume may be determined based on a desired fuel mass via a transfer function. As one example, a nominal injection volume may be determined based on a desired injection mass and a nominal fuel density, the nominal fuel density based on subcritical fuel properties.

In an alternate example, injecting the fuel includes injecting fuel for a commanded duration in order to inject a nominal mass of fuel. The duration may be a pulsewidth, and may be related to the nominal mass via one or more transfer functions. As one example, a nominal injection volume may be determined based on a desired injection mass and a nominal fuel density via a first transfer function. The nominal volume may be adjusted by the injector control parameter to determine a commanded injection volume, and a transfer function may relate the commanded injection volume to an injection pulsewidth based on an injector characterization made during the production process of the injector. As another example, a transfer function may directly relate a desired injection mass to a nominal injector pulsewidth, and the injector control parameter may adjust the nominal injector pulsewidth to a commanded injector pulse width. Additionally at 510, the change in fuel rail pressure is measured.

At 512, the change in fuel rail pressure measured at 510 is compared to an expected change in fuel rail pressure. Based on this comparison, a fuel injector control parameter may be adjusted later in routine 500. An expected change in pressure may be determined based the fuel pump gain determined at 508 and the commanded injection volume based on the injector control parameter from 510. For example, the expected change in pressure due to the injection event may be determined via the process described with reference to plot 420 at FIG. 4. In some examples, the comparison at 512 may include comparing an average of a predetermined number of measured pressure changes to an average of the corresponding expected pressure changes. For example, measured pressure changes and expected pressure changes may be compared over a predetermined number of injection events of a specific injector, and may be averaged to form a more reliable estimate of the difference. In an alternate example, the comparison at 512 may be executed for each pumping and injection event, and adjusting the injector control parameter later in the routine may include adjusting based on each comparison made at 512. Put another way, the injector control parameter may be adjusted after each injection event, or alternately adjusted periodically after a predetermined number of injection events have occurred.

In an alternate embodiment, an expected change in pressure may be based on a constant fuel pump gain that is determined based only on subcritical fuel. In other words, this alternate fuel pump gain is a fixed value that describes the slope of fuel rail pressure change versus commanded pump stroke volume for fuel that is maintained in subcritical conditions throughout the. In this embodiment, the comparison may be constructing the ratio of the measured change in fuel rail pressure to the fixed, subcritical expected change in fuel rail pressure, and applying this ratio as a fuel injector control parameter for adjusting a nominal injection volume or a nominal injection pulsewidth.

At 514 a decision to adjust or maintain the injector control parameter is made based on the comparison made at 512. The injector control parameter may be adjusted in response to the measured pressure drop differing significantly from the expected pressure drop, and may be maintained if the two do not differ significantly. The comparison may include taking the difference between the measured and expected pressure changes, or alternately may include taking the ratio of the two pressure changes.

In one example, the fuel may be supercritical at the injector, and its density at the injector may have changed from a first density to a second density. The injector control parameter may have been calibrated to accurately inject a desired mass of fuel of the first density, and therefore the controller may expect a pressure change related to the desired injection mass. However, because the density of the fuel has fluctuated, a different amount of pressure may be released from the fuel rail upon injection. Thus, the measured change in pressure may differ from the expected change in pressure due to a fluctuation in fuel density at the injector. In response to this difference in expected pressures, the injector control parameter may be adjusted to accurately deliver a desired amount of fuel of the second fuel density. However, if the measured change in pressure is within a threshold difference of the expected value, injector control parameters may be maintained. In this way, fuel injector control parameters may be calibrated in real time to maintain a desired air-fuel ratio.

Specifically, at 514, if the measured pressure change differs from the expected pressure change by more than a threshold difference, routine 500 proceeds to 516 to adjust the injector control parameter. Adjusting the injector control parameter may include, if the measured pressure change was greater than the expected pressure change by a threshold amount, decreasing the injector control parameter, and if the measured pressure change is less than the expected by a threshold amount, increasing the injector control parameter. The threshold differences may be determined based on the size of the difference in numbers (e.g., whether the difference is greater than a threshold percentage of the expected pressure change). The amount by which the injector control parameter is adjusted may be determined based on ramping a correction gain to drive the difference between the measured and corrected nominal value to zero. After adjusting the injector control parameter, routine 500 terminates. In this way, an injector control parameter may control an injected volume command to be greater when less fuel was injected than desired, and control the injected volume command to be less when more fuel was injected than desired.

In an alternate embodiment, where the injector control parameter controls an injector pulsewidth, adjusting the injector control parameter may also include increasing the fuel injector control parameter when the measured change in fuel rail pressure is less than a predicted change in fuel rail pressure, and decreasing the fuel injector control parameter when the measured change in fuel rail pressure is greater than the predicted change in fuel rail pressure. The control parameter may be directly proportional to pulsewidth, thereby increasing the pulsewidth when the injected fuel mass is greater than the desired injection mass, and decreasing the pulsewidth when the injected fuel mass is greater than the desired injection mass.

Returning to 514, if the measured pressure change (or average of measured pressure changes) is within the threshold difference of the predicted pressure change (or average of expected pressure changes), routine 500 proceeds to 518, where the current value for the injector control parameter may be maintained. After maintaining the current injector control parameter, routine 500 terminates. The injector control parameter may be continued to be adjusted based on an exhaust air-fuel ratio when the parameter is not adjusted based on a change in fuel rail pressure. In this way, if the amount of fuel delivered to a combustion chamber differs from a desired amount by more than a threshold amount, an injector control parameter may be adjusted to adjust the amount of fuel injected, thereby providing a desired air-fuel ratio. After 518, routine 500 terminates.

A specific embodiment of routine 500 for adjusting the fuel injector control parameter based on a change in fuel rail pressure after each injection event, and wherein the measured fuel pump gain is compared to a fixed subcritical fuel pump gain to determine an injector control parameter, is as follows: a pumping event may be executed based on a desired pumped mass of 0.100 g fuel. Based on a nominal (liquid) fuel density of 0.580 g/cc, the desired pump mass may be converted to a pumpstroke volume of 0.172 cc. The change in fuel rail pressure resultant from the pumping event may be measured to be 0.13 bar, and therefore the fuel pump gain is determined to be 0.726 bar/cc. A fuel injector control parameter may be adjusted based on the 0.13 bar change in fuel rail pressure. Specifically, a ratio of a constant fuel pump gain and the measured fuel pump gain of 0.726 bar/cc may be constructed and applied as the fuel injector control parameter. For example, a pumpstroke of 1 cc may result in an increase of 1 bar in the fuel rail when the fuel is liquid in the rail. Thus the injector control parameter would be the (unitless) ratio 1.32. Note that in the event that the fuel in the fuel is subcritical, the fuel injector control parameter would, in theory, be 1 because the subcritical fuel pump gain would be an accurate estimate for the behavior of the fuel.

Continuing the example, a subsequent injection event may have a desired injection mass of 0.100 g. Based again on the nominal fuel density of 0.580 g/cc, the desired or nominal injection mass may be converted to a nominal injection volume of 0.172. However, the nominal injection volume may be converted to a commanded injection volume by applying the injector control parameter. Specifically, the nominal injection volume may be adjusted to 0.228 cc by applying the fuel injector control parameter of 1.32. In this way, an amount of fuel injected may be adjusted based on a change in fuel rail pressure to deliver a more accurate amount of fuel to the combustion chamber.

Referring now to FIG. 6, it provides routine 600 for adjusting a fuel injector control parameter based on an estimated injected fuel mass, and further based on determinations of whether the fuel is each of subcritical and supercritical at the fuel pump. In the depicted example, the fuel mass is estimated based on a change in fuel rail pressure. A drop in fuel rail pressure resultant from an injection event may be used with a current factor relating a pumped fuel volume and a resultant rise in fuel rail pressure to determine a mass of fuel injected during the injection event. In some examples, routine 600 may be executed on an engine system including only a direct injector, while other examples may include executing routine 600 on an engine system including both a direct injector and a port injector. In other examples, adjusting an injector control parameter via routine 600 may include only adjusting via the routine when fuel is delivered via only a direct injector. In each of the above examples, the injectors may be injecting a fuel which is supercritical during at least some engine operating conditions, such as LPG.

At 602 the engine controller determines whether the fuel is subcritical at the fuel pump, as described below in further detail with reference to FIG. 7. In one example, determining the state of the fuel at 602 may include determining whether a direct injection fuel pump gain is above or below a lower threshold, the lower threshold determined based on inferred or measured fuel rail temperature. If the fuel is determined to be supercritical at the fuel pump, routine 600 proceeds to 603. Otherwise, routine 600 proceeds to 606.

In some examples, 602 may further include determining whether injector overlap is currently present. Determining whether injector cycles are currently overlapping may be based on comparing injection pulse signals for each injector on a fuel rail. In such examples, if there is one or more overlap of injector cycles, routine 600 continues from 604 to 630, then to 632, as described in further detail below.

However, if injector overlap is not present, routine 600 proceeds to 606. In this way, changes in fuel rail pressure may be the result of only one fuel injector and one injection event, and the control parameter for only that fuel injector may be adjusted based on the change in pressure.

At 603, one of cooling or pressure of the fuel supplied to the fuel pump is increased in order to change the state of the fuel from supercritical to subcritical or to increase the fuel pump gain. Routine 600 continues from 603 to 630, where the injector control parameter is not adjusted based on the fuel injection mass, and then to 632, where the injector parameter may be adjusted based on an estimated exhaust air-fuel ratio. Further, the fuel injector control parameter may be adjusted based on an exhaust air-fuel ratio, and selectively adjusted further based on the injection mass if fuel is subcritical at the fuel pump inlet. In this way, the fuel injector control parameter may only be adjusted when fuel is liquid at the fuel pump, providing a reliable metering device with which to calibrate the fuel injector.

A current factor relating a pumped volume of fuel and a rise in fuel pressure is determined at 606. In one example, estimating the current factor includes pumping a commanded volume of fuel into the fuel rail and measuring the resultant rise in fuel rail pressure via a pressure sensor. The relationship may be estimated for a number of pumping events and the current factor may be based on an average of the measurements. In an alternate embodiment, the current factor a fuel pump gain as described with reference to FIG. 4, and the relationship is a slope determined via a linear regression of the number of pumping events. In this way, by determining the relationship between a pumped volume of fuel and a resultant pressure rise based on a number of pumping events, the reliability of the factor relating the two variables may be more reliable.

Fuel is injected into the combustion chamber by the fuel injector based on the current injector control parameter at 607. Injecting the fuel based on the injector control parameter may include activating the fuel injector for a specified duration in order to inject a nominal mass of fuel. The duration may be a pulsewidth, and may be related to the nominal mass via one or more transfer functions. As one example, a nominal injection volume may be determined based on a desired injection mass and a nominal fuel density via a first transfer function. The nominal volume may be adjusted by the injector control parameter to determine a commanded injection volume, and a transfer function may relate the commanded injection volume to an injection pulsewidth based on an a priori relationship determined in laboratory. As another example, a transfer function may directly relate a desired injection mass to a nominal injector pulsewidth, and the injector control parameter may adjust the nominal injector pulsewidth to a commanded injector pulse width. Additionally at 607, the change in fuel rail pressure is measured.

At 608, an injected mass of fuel is determined based on the change in fuel rail pressure measured at 607. Specifically, the change in fuel rail pressure is related to a pumped volume via the current factor or fuel pump gain relating a pumped volume of fuel to a fuel rail pressure determined at 606. Because the fuel pumped into the fuel rail was subcritical, the volume of fuel pumped is well known. Additionally, a nominal fuel density is used to relate the pumped volume of fuel to a pumped mass of fuel. In this way, an injected fuel mass is estimated based on a comparison of a change in fuel rail pressure to a fuel pump gain.

At 610 the injected fuel mass estimated at 608 is compared to the nominal injected mass. As one example, the nominal injected mass may have been determined based on a desired air-fuel ratio. At 614 a decision to adjust or maintain the injector control parameter is made based on the comparison made at 610. The injector control parameter may be adjusted in response to the injected fuel mass differing by more than a threshold amount from the nominal or desired injection mass, and may be maintained if the two do not differ significantly. In one example, the fuel may be supercritical at the injector, and its density at the injector may have changed from a first density to a second density. The injector control parameter may have been calibrated to accurately inject a desired mass of fuel of the first density. However, because the density of the fuel has fluctuated, a mass of fuel different from the nominal mass may be released from the fuel rail upon injection. This difference may be detected by the change in pressure measured at 607. In response to this difference in expected pressures, the injector control parameter may be adjusted to accurately deliver fuel of the second fuel density. However, if the measured change in pressure is within a threshold difference of the expected value, injector control parameters may be maintained. In this way, fuel injector control parameters may be calibrated in real time to maintain a desired air-fuel ratio.

Specifically, at 614, if the estimated injected fuel mass change differs from nominal injection mass by more than a threshold difference, routine 600 proceeds to 616 to adjust the injector control parameter. Adjusting the injector control parameter may include increasing the fuel injector control parameter when the injected fuel mass is less than a nominal injected fuel mass, and decreasing the fuel injector control parameter when the injected fuel mass is greater than the nominal injected fuel mass. The threshold differences may be determined based on the significance of the difference between corrected nominal and actual (e.g., whether the difference is greater than threshold percentage of the expected value). The amount by which the injector control parameter is adjusted may be determined based on stability of the gain term, the adjusted amount chosen to ensure that the injected fuel masses converge toward the desired values without excessive oscillation. After adjusting the injector control parameter, routine 600 terminates. In this way, an injector control parameter may control an injected volume command to be greater when less mass was injected than desired, and control the injected volume command to be less when more mass was injected than desired.

In an alternate embodiment, where the injector control parameter controls an injector pulsewidth, adjusting the injector control parameter may also include increasing the fuel injector control parameter when the injected fuel mass is less than a nominal injected fuel mass, and decreasing the fuel injector control parameter when the injected fuel mass is greater than the nominal injected fuel mass. The control parameter may be directly proportional to pulsewidth, thereby increasing the pulsewidth when the injected fuel mass is greater than the desired injection mass, and decreasing the pulsewidth when the injected fuel mass is greater than the desired injection mass.

Returning to 614, if the injected fuel mass (or average of injected fuel masses) is within the threshold difference of the commanded injection mass (or average of commanded injection masses), routine 600 proceeds to 618, where the current value for the injector control parameter may be maintained. After maintaining the current injector control parameter, routine 600 terminates. The injector control parameter may be continued to be adjusted based on an exhaust air-fuel ratio when the parameter is not adjusted based on an injected fuel mass, the fuel mass estimated based on a change in fuel rail pressure. In this way, if the mass of fuel delivered to a combustion chamber differs from a desired amount by more than a threshold amount, an injector control parameter may be adjusted to adjust the amount of fuel injected, thereby providing a desired air-fuel ratio. After 618, routine 600 terminates.

Turning now to FIG. 7, an example prophetic sequence for adjusting a fuel injector control parameter based on an exhaust air-fuel ratio, selectively adjusting the fuel injector control parameter further based on a fuel pump gain, and operating a fuel injector control parameter based on the fuel injector control parameter is shown. Adjusting the fuel injector control parameter further based on the fuel pump gain may be performed in response to a determination that the fuel is subcritical at the fuel pump, and not performed in response to a determination that the fuel is supercritical at the fuel pump. Although not explicitly shown, the injector control parameter is adjusted based on an estimated exhaust air-fuel ratio (e.g., via methods for long term and short term fuel trims) throughout the duration of the sequence. However, the fuel changing from a subcritical state to a supercritical state presents a significant (and instantaneous) change in injection masses. Relying on exhaust measurements to correct the injector errors may result in inefficient response times to the change in fuel state. Thus, adjusting the injector control parameters in an open-loop manner (e.g., based on measurements of pressure changes resultant from the injection) provides an improved response time to large fluctuations in injection calibration.

The injector control parameter may be for a direct injector (e.g., 166 at FIG. 1) and the fuel pump gain may be of a direct injection fuel pump (e.g., 240 of FIG. 2). The sequence of FIG. 7 may be provided by the system of FIG. 1 according to the methods of FIGS. 5 and 6. The fuel supplied to direct injector 166 of FIG. 1 may be subcritical during at least some engine operating conditions, for example LPG. Vertical markers T0-T2 represent times of interest during the operating sequence.

The first plot of FIG. 7 is a plot of fuel pump gain (e.g., the slope of fuel rail pressure rise versus a commanded pumping volume as described with reference to FIG. 4) versus time. The fuel pump gain may be based on the volumetric efficiency of the pump. In one example, the fuel pump gain may increase as the volumetric efficiency of the pump increases, and decrease as the volumetric efficiency of the pump decreases. The Y axis represents direct injection fuel pump (e.g., 240 of FIG. 2) gain, and gain increases in the direction of the Y axis arrow. Alternatively the Y axis may represent the ratio of a factor relating a drop in fuel rail pressure to a commanded injection volume and the fuel pump gain described above, where the ratio increases in the direction of the Y axis. The X axis represents time and time increases in the direction of the X axis arrow. Horizontal line 712 represents a lower threshold gain. It may be determined that the fuel at the fuel pump is subcritical when the fuel pump gain is above horizontal line 712, and that the fuel at the fuel pump is supercritical when the fuel pump gain is below horizontal line 712.

In the example where the Y axis represents the ratio described above, horizontal line 712 represents a 1:1 ratio. For a given volume of fuel leaving the fuel rail, the pressure drop may be smaller if the fuel is supercritical and may be larger if it is subcritical. If subcritical, the density may not appreciably change and the relation between pumped fuel and injected fuel may be 1:1. However, supercritical fuel may be a less dense than subcritical fuel, thus less mass may leave the fuel rail for a given injection volume, and the ratio represented along the Y axis may be less than 1:1 when subcritical fuel is pumped but supercritical fuel is injected. In this way, determining whether the fuel is supercritical at the injection site may be performed without knowledge of fuel composition. One of cooling and pressure of the fuel at the fuel pump may be increased in response to a fuel pump gain below horizontal line 712.

The second plot of FIG. 7 is a plot of a fuel injector control parameter versus time. In one example, the fuel injector may be a direct fuel injector (e.g., injector 166 at FIG. 1) and the injector control parameter may be an injector gain which controls a commanded injection volume. Controlling the commanded injection volume may include adjusting a nominal injection volume. Thus in one example, the Y axis represents direct fuel injector gain for a single injector and gain increases in the direction of the Y axis arrow. The X axis represents time and time increases in the direction of the X axis arrow.

Horizontal line 722 may represent a default level of the injector control parameter, or may represent a desired level for the injector control parameter. For example, the injector control parameter may be a unitless injector gain which adjusts a commanded injection volume, the commanded injection volume based on properties of subcritical fuel. In this case, horizontal line 722 may be unity, the default level of the injector gain, and the injector may be operated with an injection gain at unity. The injector gain may be adjusted from unity to a different value during conditions in which the properties of the injected fuel are not those of the subcritical fuel (such as if the fuel is supercritical at the injection site). It will be appreciated that in other examples the injector control parameter may be a parameter other than an injector gain. For example, the injector control parameter that is adjusted based on a fuel pump gain may instead be a parameter for controlling an injector pulsewidth rather than a commanded injection volume.

The third plot of FIG. 7 is a plot of fuel state at a direct injector versus time. Specifically, the fuel state depicted is within the fuel rail, at the inlet of the injector. The Y axis represents the state of fuel at a direct injector (e.g., 166 of FIG. 2). The fuel is supercritical when the trace is at a higher level near the Y axis arrow. The fuel is subcritical when the trace is at a lower level near the X axis. The X axis represents time and time increases in the direction of the X axis arrow.

At time T0, the fuel state at the injector is subcritical. The fuel pump gain is above the lower threshold 712, and the fuel injector control parameter is within a threshold level of default value 722. Between times T0 and T1, the fuel state at the fuel injector remains subcritical. During this time, slight adjustments may be made to the fuel injector control parameter based on exhaust air-fuel ratios as estimated via UEGO measurements. Also during this time, the fuel pump gain estimate (i.e., plot 410 of FIG. 4) may be monitored, however due to the subcritical conditions within the fuel rail, the value will remain consistent. The fuel injector control parameter may not be adjusted based on the fuel pump gain because the measured gain may be within the expected gain. In this way, a fuel injector control parameter may be adjusted based on feedback from an exhaust gas sensor, and during some conditions may be further adjusted based on a fuel pump gain.

At time T1, the fuel state at the injector becomes supercritical. Determining whether the fuel state is subcritical or supercritical may be based on one or more of the fuel pump gain dropping below lower threshold 712 (as illustrated), an inferred or measured fuel rail temperature, exhaust gas sensor readings, and temperature measurements at the fuel injector. During this time, estimates of a fuel pump gain may differ from fuel pump gain estimates during subcritical conditions, and fuel pump gain values may be adjusted based on an average of fuel pump gain estimates. However, in the illustrated example, the lower density of supercritical fuel results in a lower fuel pump gain due to less mass being pumped into the fuel rail for a given pump stroke volume, thereby resulting in a lower pressure increase per unit volume of pumped fuel.

Continuing between times T1 and T2, an injector control parameter is adjusted in response to the change in fuel rail pressure differing from an expected change in fuel rail pressure. In the illustrated example, the injector control parameter is increased in response to a decrease in fuel pump gain, and thus the injector delivers a greater volume of fuel per injection event when operating with the updated control parameter. In this way, an injection mass may be maintained at a desired value throughout a wide range of engine operating conditions.

After the initial adjustment of the injector control parameter based on a change in pressure, the injector control parameter is further adjusted based on feedback from an exhaust sensor, as illustrated by slight fluctuations in the injector control parameter after a more pronounced increase from the default level.

At time T2, the fuel state at the injector changes from supercritical to subcritical. The fuel density in the fuel rail may increase due to its subcritical state. Accordingly, the fuel pump gain may increase. In response to the increase in fuel pump gain, the injector control parameter is decreased, thereby delivering a smaller volume fuel per injection event. Specifically, the injector control parameter is gradually decremented toward a value near the default value 722, and is further adjusted based on feedback from an exhaust gas sensor. In this way, a fuel injector control parameter operates at a default value when fuel is subcritical at the injection site and is adjusted based on an exhaust air-fuel ratio, and is adjusted further based on a fuel pump gain when the fuel is supercritical at the injection site and subcritical at the fuel pump inlet.

The technical effect of adjusting an injector control parameter based on a fuel pump gain addition to injector control corrections based on exhaust air-fuel ratio feedback, response times for adjusting injector control parameters may be improved. By only adjusting injector control parameters when fuel is subcritical at the fuel pump, measurements in the fuel pump may be considered reliable and may be used to estimate conditions at the injection site where fuel is supercritical. Overall, fuel injection masses can be better monitored, and supercritical fuel can be more accurately injected, improving air-to-fuel ratios and providing the cleaning benefits of supercritical fuel.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a fuel system, comprising:
adjusting a fuel injector control parameter based on an exhaust air-fuel ratio;
selectively adjusting the fuel injector control parameter further based on a fuel pump gain;
operating a fuel injector based on the fuel injector control parameter; and
wherein the selectively adjusting includes:
adjusting the fuel injector control parameter further based on the fuel pump gain in response to a determination that the fuel is subcritical at the fuel pump; and
not adjusting the fuel injector control parameter further based on the fuel pump gain in response to a determination that the fuel is supercritical at the fuel pump.

2. The method of claim 1, wherein the fuel injector control parameter is applied to a direct fuel injector and wherein the fuel pump gain is of a direct fuel injector pump.

3. The method of claim 1, wherein the fuel is LPG.

4. The method of claim 1, wherein the gain of the fuel pump is estimated a number of times and wherein the fuel injector control parameter is adjusted further based on an average of the estimated gain of the fuel pump.

5. The method of claim 1, wherein the fuel injector control parameter controls an injection pulsewidth.

6. The method of claim 1, wherein the fuel pump gain is a slope of a fuel rail pressure rise versus a commanded pumping volume.

7. The method of claim 5, wherein the adjusting further based on the fuel pump gain includes:
as the fuel pump gain decreases, increasing the fuel injector control parameter; and
as the fuel pump gain increases, decreasing the fuel injector control parameter.

8. A method for a fuel injection system, comprising:
adjusting a fuel injector control parameter based on a change in fuel rail pressure and further based on determinations of whether the fuel is each of subcritical and supercritical at the fuel pump.

9. The method of claim 8, wherein the fuel injector control parameter adjusts an injection volume command.

10. The method of claim 8, wherein:
the adjusting is based on a difference of a measured change in fuel rail pressure to a predicted change in fuel rail pressure.

11. The method of claim 8, wherein the fuel injector control parameter is adjusted after each injection event.

12. The method of claim 8, wherein:
the adjusting is based on a difference of a measured change in fuel rail pressure to a predicted change in fuel rail pressure, and
the change in fuel rail pressure is estimated a number of times and wherein the fuel injector control parameter is adjusted based on an average of the estimated changes in fuel rail pressure.

13. The method of claim 8, wherein the adjusting includes:
increasing the fuel injector control parameter when the measured change in fuel rail pressure is less than the predicted change in fuel rail pressure, and
decreasing the fuel injector control parameter when the measured change in fuel rail pressure is greater than the predicted change in fuel rail pressure.

14. The method of claim 8, wherein the fuel is LPG.

15. A method for a fuel injection system, comprising:
adjusting a fuel injector control parameter based on an estimated injected fuel mass and further based on determinations of whether the fuel is each of subcritical and supercritical at the fuel pump.

16. The method of claim 15, wherein:
the injected fuel mass is estimated based on a comparison of a change in fuel rail pressure to a fuel pump gain,
the fuel injector control parameter is adjusted based on the difference of the estimated injected fuel mass and a nominal injected fuel mass, and
the fuel injector control parameter controls an injected volume command.

17. The method of claim 15, wherein the adjusting includes:
increasing the fuel injector control parameter when the injected fuel mass is less than a nominal injected fuel mass, and
decreasing the fuel injector control parameter when the injected fuel mass is greater than the nominal injected fuel mass.

18. The method of claim 15, wherein the fuel pump gain is estimated a number of times and wherein the fuel injector control parameter is adjusted based on an average of the comparisons of fuel rail pressure changes to an average of the fuel pump gain.

19. The method of claim 15, wherein the fuel is LPG.

* * * * *